(12) United States Patent
Tardif et al.

(10) Patent No.: US 8,403,394 B2
(45) Date of Patent: Mar. 26, 2013

(54) PICKUP TRUCK TAILGATE ACCESSORY DRILL-LESS ADAPTER

(75) Inventors: Thomas A. Tardif, Laconia, NH (US); Douglas J. Lambert, Gilford, NH (US)

(73) Assignee: Lock N Load Systems LLC, Gilford, NH (US)

( * ) Notice: Subject to any disclaimer, the term of this patent is extended or adjusted under 35 U.S.C. 154(b) by 102 days.

(21) Appl. No.: 13/158,504

(22) Filed: Jun. 13, 2011

(65) Prior Publication Data

US 2012/0313393 A1 Dec. 13, 2012

(51) Int. Cl.
*B60P 1/00* (2006.01)
(52) U.S. Cl. .......................................................... 296/50
(58) Field of Classification Search ................ 296/3, 50, 296/57.1, 58, 59, 60, 106, 26.11, 26.08; 292/DIG. 29; 224/402–404
See application file for complete search history.

(56) References Cited

U.S. PATENT DOCUMENTS

| | | | |
|---|---|---|---|
| 6,170,724 B1 * | 1/2001 | Carter et al. | 224/404 |
| 6,857,678 B2 | 2/2005 | Lisk, III | |
| 8,182,182 B2 * | 5/2012 | Tardif et al. | 410/100 |
| 2002/0140244 A1 | 10/2002 | Kuhn et al. | |
| 2003/0039534 A1 * | 2/2003 | Radosevich et al. | 414/537 |
| 2003/0127873 A1 | 7/2003 | Reed | |
| 2003/0201657 A1 | 10/2003 | Whiteford et al. | |
| 2005/0099033 A1 * | 5/2005 | Chverchko et al. | 296/100.09 |
| 2006/0076794 A1 | 4/2006 | Bauer | |
| 2008/0048465 A1 | 2/2008 | Hawley | |
| 2011/0179692 A1 * | 7/2011 | McKnight et al. | 43/21.2 |

* cited by examiner

*Primary Examiner* — Lori Lyjak
(74) *Attorney, Agent, or Firm* — Robert R. Deleault, Esq.; Mesmer & Deleault, PLLC

(57) ABSTRACT

A tailgate accessory drill-less adapter for connecting a tailgate accessory to a tailgate portion of a pick-up truck includes an elongated body having a first side, a bottom edge, a first side edge, and a second side edge, the first side edge having a tailgate latch bolt slot transverse to the first side edge and through the elongated body, the slot positioned a predefined distance from the bottom edge, and an offset hook anchor having a hook portion and a hook body portion, the offset hook anchor connected to the first side adjacent to but spaced from the second side edge where the hook portion is adjustably extendable.

20 Claims, 7 Drawing Sheets

PICKUP TRUCK TAILGATE ACCESSORY DRILL-LESS ADAPTER

BACKGROUND OF THE INVENTION

1. Field of the Invention

The present invention relates generally to devices for enhancing the cargo carrying or hauling ability of a pickup truck.

2. Description of the Prior Art

Pickup trucks include beds positioned behind the operator's cabin or cab. The beds are used for carrying various types of cargo including, but not limited to, lumber, tools, machinery, and the like as well as any object that can be carried in/by the bed of the pickup truck. Oftentimes, an owner of a pickup truck will install or have installed a cover over the bed of the pickup truck. The cover may be a "hard" cover that extends above the top of the sidewalls of the bed or it may be a "soft" cover. Both types of covers are known as a tonneau cover. The cover may be retractable or not. The purpose of the bed cover is to protect the bed and any items carried in the bed from the elements such as the sun, rain, sleet, snow, hail, wind, leaves, and vermin. The tonneau cover also adds security by hiding the contents in the bed and increasing the time required to remove the cover to discover and steal the contents in the bed. In addition, tonneau covers add a look that many consider to be stylish by giving the truck bed a streamlined look.

To prevent the cargo from sliding off of the bed during transport, a tailgate is typically provided. The tailgate is a door hingedly connected to the bed along its bottom edge and is typically movable between a fully open position in which it extends essentially and substantially co-planar with the floor of the bed and a fully closed position. A latch mechanism is provided on each of the opposing sides of the tailgate interface with corresponding tailgate latch bolts provided on the sidewalls of the bed to maintain the tailgate in the fully closed position. A handle is also provided to selectively disengage the latch mechanism and permit the tailgate to be opened.

Pickup trucks have become a common conveyance for many people. In recent years, many trucks include added passenger seating. In many instances, manufacturers of pickup trucks wish to avoid increasing either the wheelbase or the overall length of the truck when further seating capacity is added. As a result, the manufacturer often shortens the truck bed of the pickup truck. Unfortunately, the result is reduced cargo carrying capacity.

Several attempts have been made to develop suitable accessories to enhance the carrying characteristics of a pickup truck. These include primarily truck bed extenders, however, other devices include tool boxes mounted on the inside or the outside of the bed, truck racks, and the like.

SUMMARY OF THE INVENTION

The prior art suffers from various disadvantages. Most of those devices interfere with the use of standard tonneau covers and are usually permanently mounted to the bed and/or bed sidewalls using bolts, screws and the like, which require drilling into the bed floor and/or sidewalls. Most bed extenders require drilling into at least the tailgate in order to anchor the extender. Some require attachment to a hitch in order to provide an easily removable extender. The hitch type extenders, however, are supported by a single tubular extension that is removably connected to the hitch receiver. The single tubular extension tends to have an acceptable amount of "play" that causes the extended surface to move relative to the tailgate of the pickup truck. Each of the prior art truck bed devices has a custom-designed attachment system for fixedly attaching that particular device to the tailgate and/or bed of the truck, which are not interchangeable with other devices. Therefore, what is needed is a tailgate accessory system that improves upon the disadvantages of the prior art.

It is an object of the present invention to provide a tailgate accessory drill-less adapter that does not require a user to drill holes into the tailgate, truck bed sidewalls and/or the truck bed floor to secure the adapter to the pickup truck.

The present invention achieves these and other objectives by providing a tailgate accessory adapter for connecting a tailgate accessory to a tailgate portion of the cargo bed of a pickup truck.

In one embodiment of the present invention, a tailgate accessory drill-less adapter for connecting a tailgate accessory to a tailgate portion of a pick-up truck includes an elongated body and an offset hook anchor. The elongate body has a first side, a bottom edge, a first side edge, and a second side edge. The first side edge has a tailgate latch bolt slot transverse to the first side edge and through the elongated body. The slot is positioned a predefined distance from the bottom edge to provide a first attachment point to a tailgate latch bolt. The offset hook anchor has a hook portion and a hook body portion. The offset hook anchor is connected to the first side adjacent to but spaced from the second side edge where the hook portion is adjustable along an axis transverse to the bottom edge and configured to be retained within a tailgate sidewall opening as a second attachment point.

In another embodiment of the present invention, the tailgate latch bolt slot has a slot recess disposed on a second side of the elongated body where the slot recess is wider than the slot and configured to receive the head of the tailgate latch bolt.

In a further embodiment of the present invention, the tailgate latch bolt slot has a shape that is one of curved, straight, angled, and L-shaped.

In another embodiment of the adapter of the present invention, the bottom edge has a notch adjacent the first side edge where the notch is configured to be disposed over a pivot of a tailgate of a pickup truck.

In still another embodiment of the present invention, the notch in the bottom edge terminates in an arcuate surface.

In yet another embodiment of the present invention, the hook portion of offset hook anchor extends from a first hook body side of hook body portion then, defining about a ninety degree bend, extends a predefined distance from the first hook body side and longitudinally extends a predefined distance parallel to and away from the hook body portion.

In another embodiment of the present invention, the hook body portion has a component selected from a longitudinal slot therethrough, an aperture for receiving a retaining hardware rod therethrough, a threaded aperture for receiving a threaded retaining hardware rod, and a retaining hardware threaded rod extending from a second hook body side a predefined distance.

In another embodiment of the present invention, the elongated body of the adapter has one component selected from a longitudinal slot therethrough spaced from the bottom edge and extending parallel to and adjacent the second side edge for adjustably connecting the offset hook anchor, an aperture for receiving a retaining hardware rod therethrough, a threaded aperture for receiving a threaded retaining hardware rod, and a retaining hardware threaded rod extending from the first side of the elongated body.

In a further embodiment of the present invention, the adapter includes an offset hook anchor recess in the first body side extending from the bottom edge a predefined distance parallel to the second side edge and configured to receive the hook body portion.

In still another embodiment of the present invention, the adapter body includes one or more attaching structures for securing a tailgate accessory to the adapter where the one or more attaching structures are one or more of an opening, a slot, a recess, a channel, a slit, a socket, a cut, and a groove and any combination thereof.

In yet another embodiment of the present invention, the adapter body includes a bracket connected to the second side of the adapter body enabling a fastener-free mating with the tailgate accessory.

In another embodiment of the present invention, there is disclose a method of attaching a tailgate accessory adapter to a tailgate without drilling apertures into the truck bed sidewall, the truck bed floor and/or the tailgate. The method includes obtaining a set of complementary, mirror-image tailgate accessory drill-less adapters and an offset hook anchor on each of the adapters. Each of the drill-less adapters has an elongated adapter body having a first side, a bottom edge, a first side edge, and a second side edge. The first side edge has a tailgate latch bolt slot transverse to the first side edge and through the elongated body. The slot is positioned a predefined distance from the bottom edge to provide a first attachment point to a tailgate latch bolt and an offset hook anchor having a hook portion and a hook body portion. The offset hook anchor connects to the first side adjacent to but spaced from the second side edge. The hook portion is adjustable along an axis transverse to the bottom edge and configured to be retained within a tailgate sidewall opening as a second attachment point. The method further includes inserting the hook portion into a tailgate sidewall opening located on the side wall of the tailgate, which is in an open position where the aperture is closer to a bottom of the tailgate than a top of the tailgate and disposing the tailgate latch bolt slot around the tailgate latch bolt, and adjusting the height of each adapter and tightening the offset hook anchor to the adapter body whereby the hook portion and the tailgate latch bolt slot secures the adapter to the tailgate latch bolt and the tailgate.

DETAILED DESCRIPTION OF THE PREFERRED EMBODIMENT

Figure 1:
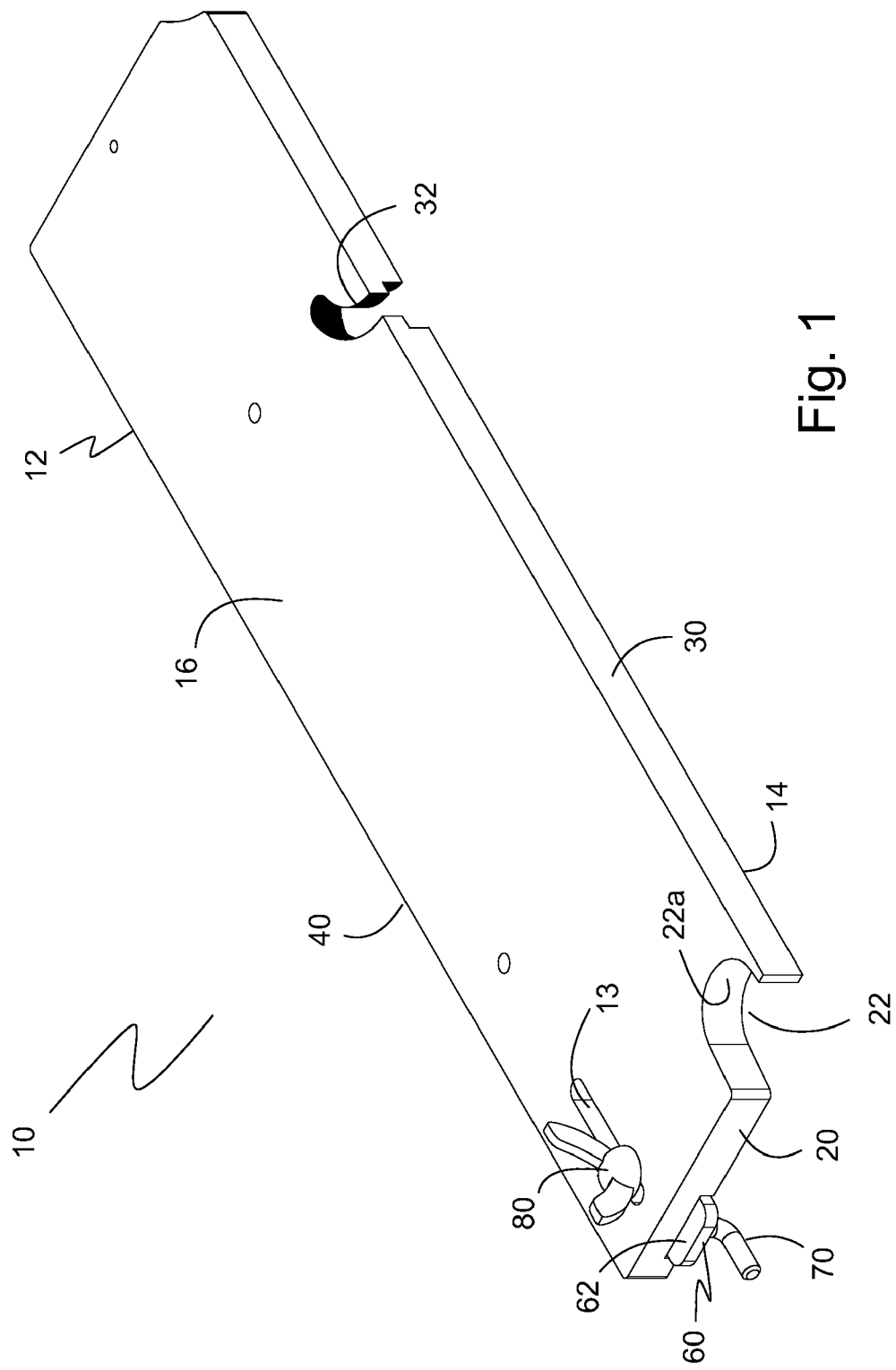
FIG. 1 is a perspective view of one embodiment of the present invention showing a first side of a tailgate accessory drill-less adapter.

The preferred embodiments of the present invention are illustrated in FIGS. 1-11. For purposes of this disclosure, the term "pickup truck bed" includes a tailgate, a pair of bed sidewalls and a bed floor. FIG. 1 shows one embodiment of a tailgate accessory, drill-less adapter 10 of the present invention. Drill-less adapter 10 includes an elongated adapter body 12 and an offset hook anchor 60. Elongated adapter body 12 has a first side 14, a bottom edge 20, a first side edge 30, and a second side edge 40. Bottom edge 20 has an optional notch 22 adjacent first side edge 30 where notch 22 has a width sufficient to accommodate being disposed over a tailgate pivot (shown in FIG. 6). Optional notch 22 may also optionally terminate in an arcuate surface 22a. First side edge 30 has a tailgate latch bolt slot 32 that is transverse to first side edge 30. Bolt slot 32 extends completely through adapter body 12. As can be seen, bolt slot 32 is positioned a predefined distance from bottom edge 20.

Offset hook anchor 60 includes a hook body portion 62 and a hook portion 70. Offset hook anchor 60 is connected to first side 14 adjacent to but spaced from second side edge 40. In this embodiment, adapter body 12 has a hook component through slot 13 that is an enclosed slot with a predefined length. It is also contemplated that through slot 13 may have an open end on bottom edge 20. Through slot 13 is parallel and adjacent to second side edge 40 and transverse to bottom edge 20 where through slot 13 has a width to accommodate a fastener 80 such as a wing bolt that connects to offset hook anchor 60. Accordingly, hook body portion 62 includes an aperture to receive the fastener 80. Hook component through slot 13 permits adjustment of offset hook anchor 60 in a longitudinal direction along an axis 18 relative to adapter body 12 in order to adjust drill-less adapter 10 to varying distances between the tailgate pivot and the tailgate latch bolt of different pickup truck manufacturers. Even though a wing bolt is shown and through slot 13 is disposed in adapter body 12, it is contemplated that through slot 13 may be disposed within hook body portion 62 while adapter body 12 has an aperture for receiving a fastener. It is also contemplated that the aperture, whether in adapter body 12 or hook body portion 62, may be threaded to receive a threaded rod portion of a fastener or unthreaded to receive a bolt and nut type fastener.

Figure 2:
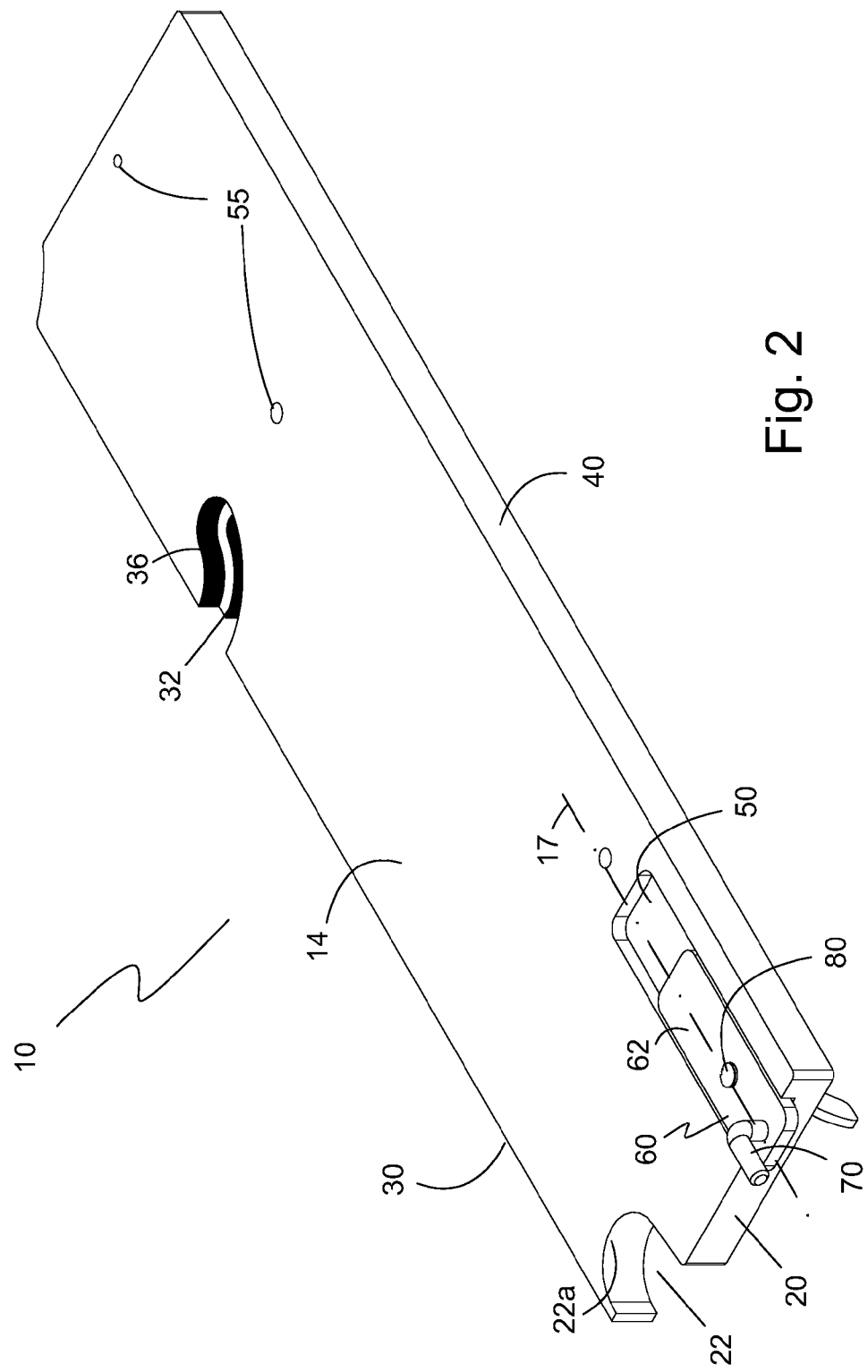
FIG. 2 is a perspective view of the embodiment in FIG. 1 showing an opposite side of the tailgate accessory drill-less adapter and an offset hook anchor.

Turning now to FIG. 2, there is illustrated the opposite side of the embodiment shown in FIG. 1. As previously disclosed, tailgate accessory adapter 10 includes an adapter body 12 having first side 14, a second side 16, bottom edge 20, first side edge 30, second side edge 40, and tailgate latch bolt slot 32. Optionally, adapter body 12 may include a tailgate latch bolt recess 36 that is wider than latch bolt slot 32. Latch bolt recess 36 preferably has a depth and width to accommodate a latch bolt head 4 (shown in FIG. 6). The depth is preferably equal to, but more preferably, greater than the thickness of latch bolt head 4 so that latch bolt head 4 does not interfere with any tailgate accessories used with drill-less adapter 10. Additionally, adapter body 12 may optionally include an offset hook anchor recess 50. Offset hook anchor recess 50 preferably has a width and depth to accommodate hook body portion 62. The width is preferably of a dimension that allows hook body portion 62 to slide in a longitudinal direction within recess 50 but prevents offset hook anchor from twisting/rotating relative to second side 16 of adapter body 12. The depth is preferably equal to, but more preferably, greater than the thickness of hook body portion 62 so that hook body portion does not interfere with any tailgate accessories used with drill-less adapter 10.

Figure 3:
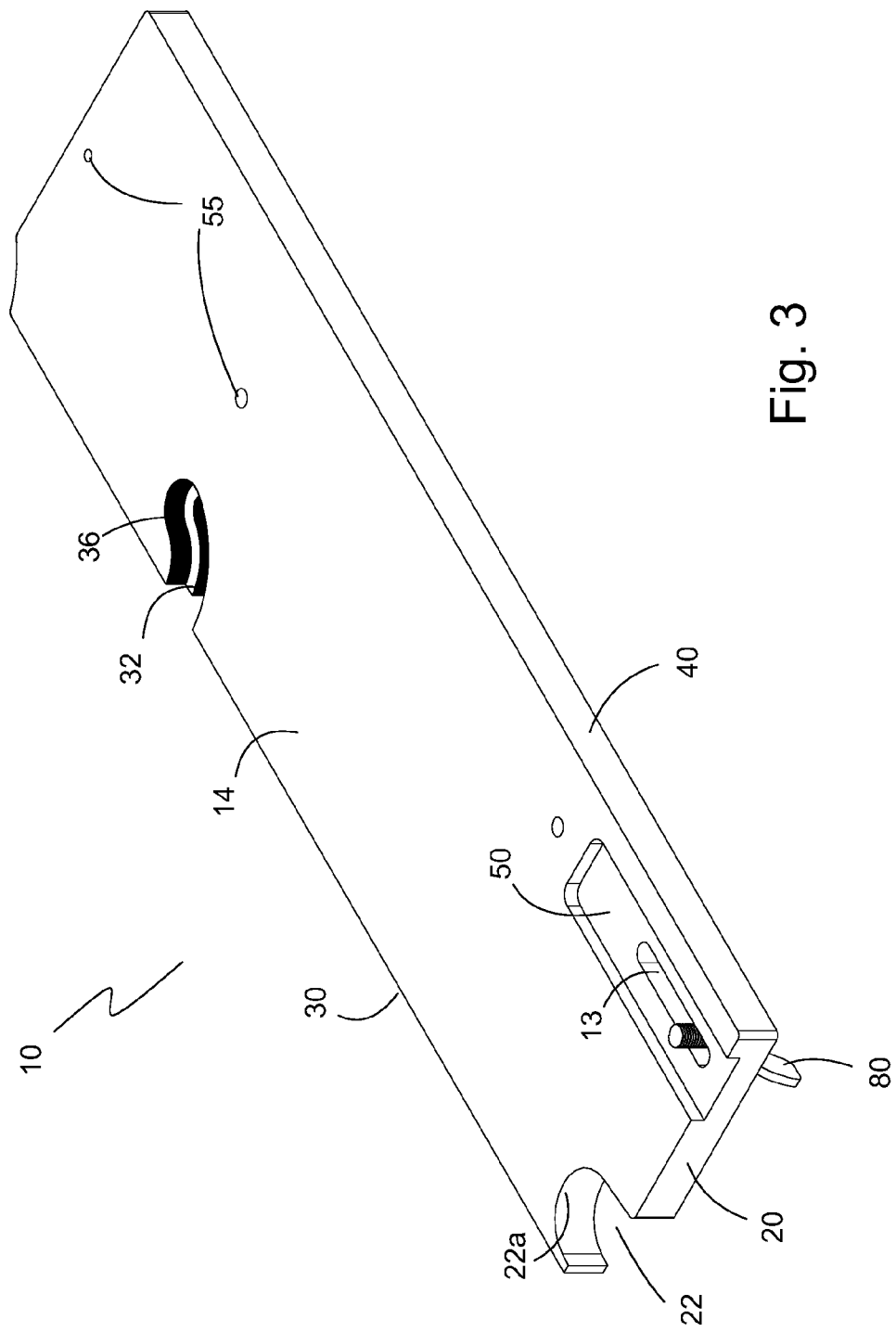
FIG. 3 is a perspective view of the embodiment in FIG. 2 with the offset hook anchor removed.

FIG. 3 illustrates the embodiment in FIG. 2 except that offset hook anchor 60 is removed. Like in FIG. 2, FIG. 3 shows tailgate accessory drill-less adapter 10 with all the various structural parts including the optional structure of the latch bolt recess 36 and offset hook recess 50. As can be seen in FIG. 3, offset hook recess 50 has hook component through slot 13 with fastener 80 disposed within through slot 13. Because fastener 80 connects to hook body portion 62 by way of an opening to receive fastener 80 therethrough for later attaching a nut or of a threaded opening to receive the threaded rod portion of fastener 80, through slot 13 allows offset hook anchor 60 (shown in FIG. 2) to be adjusted relative to the latch bolt slot 32. Other features 55 of adapter body 12 that may optionally be included are one or more of an opening, a slot, a recess, a channel, a slit, a socket, a cut, a groove, and a bracket, and the like, and any combination thereof, for securing a tailgate accessory to drill-less adapter 10. Tailgate accessories include, but are not limited to, a tailgate box, a truck rack, a bed extender, etc.

Figure 4:
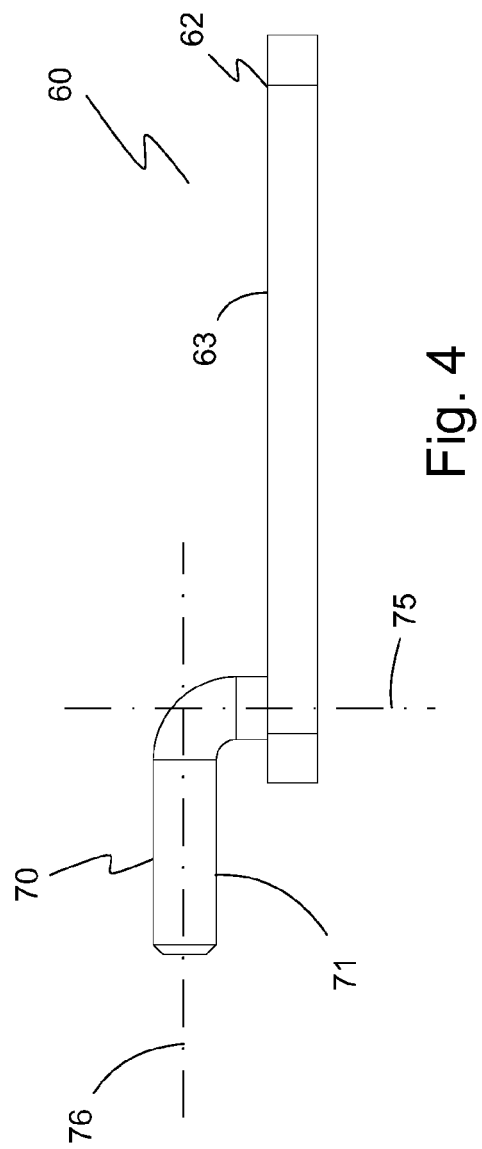
FIG. 4 is a side view of one embodiment of the offset hook anchor.
Figure 5:
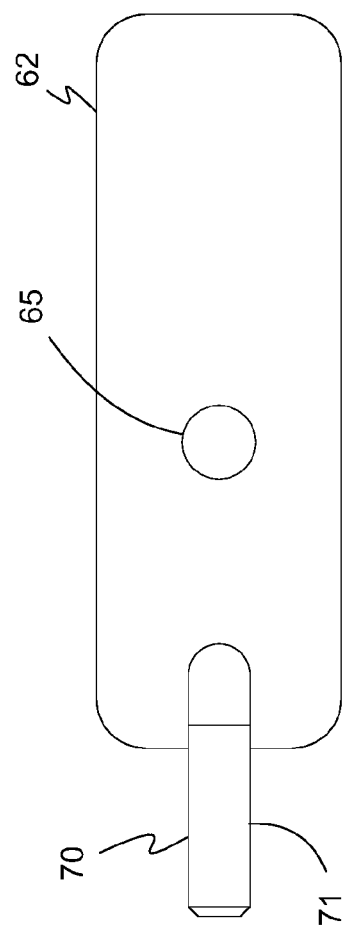
FIG. 5 is a top view of the embodiment in FIG. 4.

FIG. 4 is an enlarged, side view of one embodiment of offset hook anchor 60. Offset hook anchor 60 includes hook body portion 62 and hook portion 70. Hook portion 70 preferably has the shape of a rod with an elongated end portion 71 extending longitudinally away from connector body 31 for a predefined distance and is offset from hook body portion 62. More specifically, hook portion 70 is transversely connected to a first body surface 63 of hook body portion 62 and extends a predefined distance away from first body surface 63 along a first hook axis 75. Hook portion 70 then extends along a second hook axis 72 that is transverse to first hook axis 71 in a relatively parallel orientation to hook body portion 62. Hook portion 70 is preferably formed from a rod having a three-eighths' inch diameter (⅜") (9.5 mm). It is noted, however, that a bar or flat stock having a width similar to the rod may be used in place of the rod. Elongated end portion 71 is sized to fit through one of the tailgate sidewall openings in the side edge of the tailgate of a pickup truck and the offset characteristic functions to interlock with the tailgate opening by positioning the elongated end portion 71 against the back plane of the wall in which the tailgate opening is formed, which is more clearly shown in FIG. 6. FIG. 5 is a top view of the embodiment of offset hook anchor 60 shown in FIG. 4. As shown, hook body portion 62 has a body portion opening 65 for receiving fastener 80 (not shown). Body portion opening 65 may be a through opening to receive a bolt portion of fastener 80 therethrough or may be threaded to threadably receive a threaded bolt portion of fastener 80 or may be a through slot while the corresponding area on adapter body 12 has the bolt opening that may be threaded or not depending on fastener 80 used.

Figure 6:
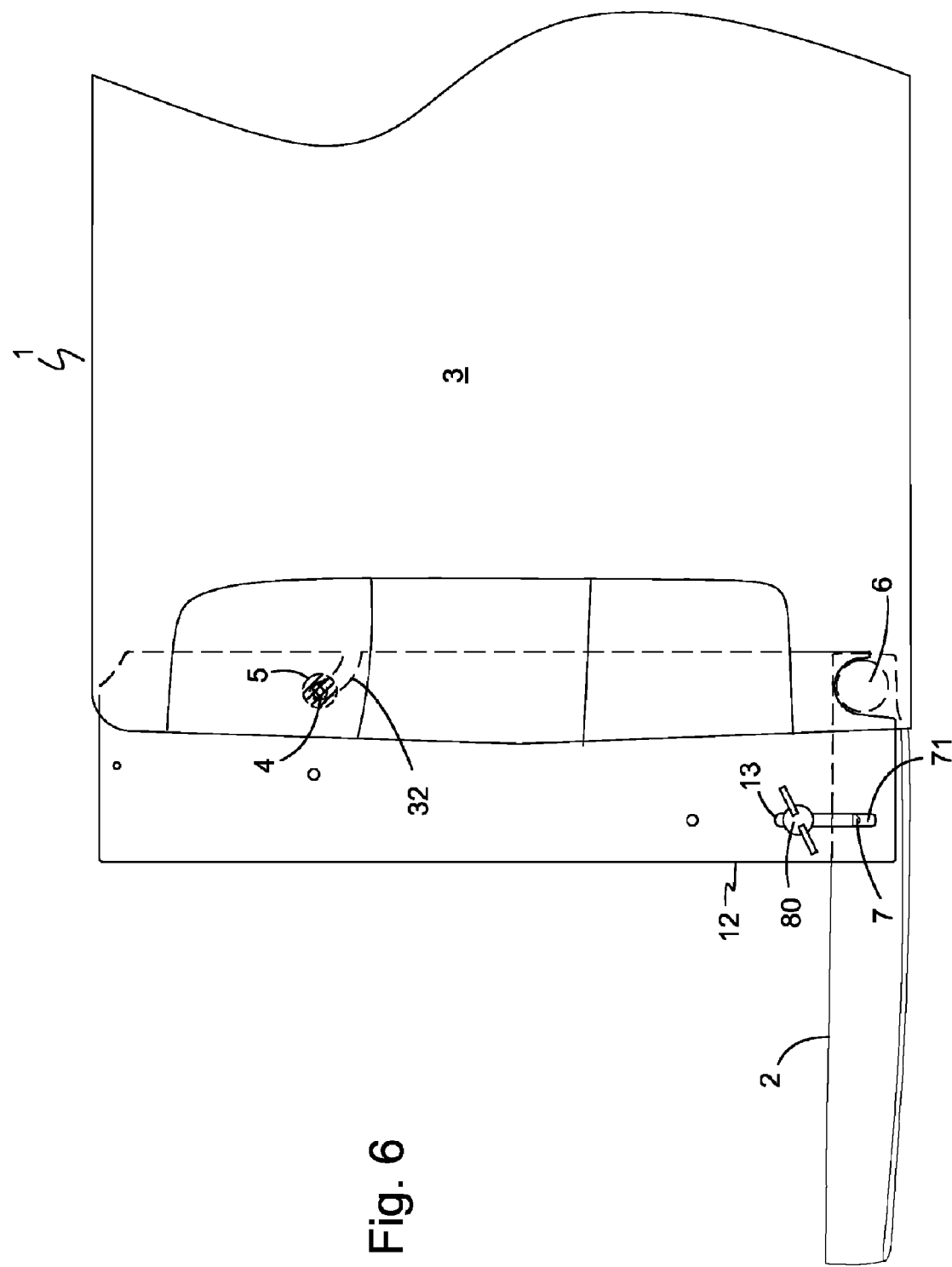
FIG. 6 is a side view of the embodiment in FIG. 1 showing the adapter attached to a tailgate and a sidewall of a pickup truck bed.

Turning now to FIG. 6, there is illustrated a side view of the embodiment of the tailgate accessory drill-less adapter 10 of the present invention attached to a pickup truck 1. Pickup truck 1 has a cargo bed formed by bed sidewalls 3 and tailgate 2. Tailgate 2 is in a downward, open position in which it extends essentially and substantially co-planar with the floor of the bed (not shown). Tailgate 2 has a pivot 6 on opposed lower edges of the tailgate that hingedly connects tailgate 2 to the bed. As can be seen, bed sidewall 3 has a tailgate latch bolt 4 with a latch bolt head 5 that is wider than latch bolt 4. Latch bolt slot 31 of drill-less adapter 10 is disposed onto latch bolt 4 and elongated end portion 71 of hook portion 70 is disposed through a tailgate opening 7 in a sidewall 8 in tailgate 2. Fastener 80 securely maintains hook portion 70 against adapter body 12. It is noted that an important feature of adapter 10 is that adapter 10 is mounted to the pickup truck 1 without requiring the drilling of apertures in the bed floor, bed sidewalls or tailgate and is easily attached and/or removed. To accomplish this important feature, it should be noted that adapter 10 requires at least two points of attachment to the pickup truck bed. In this case, the two points of attachment are the tailgate latch bolt and the tailgate sidewall opening. Optionally, bottom edge 20 may include notch 22 that is formed to be fittingly disposed over pivot 6 and/or the relative position of bottom edge 20 and through slot 13 are such to allow bottom edge 20 to be supported by a tailgate lip 2a (shown in FIG. 8) of tailgate 2. Either option would provide a third securing/support point on the pickup truck. It should further be noted that tailgate bolt slot 32 may be a straight, transverse slot or a curved transverse slot so long as it prevents adapter 10 from inadvertently being removed from engagement with the latch bolt 4 without releasing the offset hook anchor 60 from its secure engagement with the adapter body 12 and the tailgate opening 7 of tailgate 2.

Figure 7:
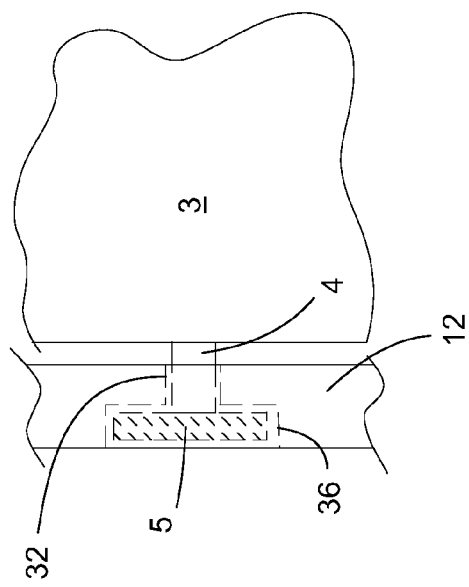
FIG. 7 is a partial, cross-sectional view of the embodiment in FIG. 1 showing the adapter connected to a tailgate latch bolt.

FIG. 7 is a partial view of the relationship of the latch bolt slot 32 and tailgate latch bolt 4. In this view, adapter 10 includes optional latch bolt recess 36. Optional latch bolt recess 36 is recessed to a depth that allows first side 14 of adapter body 12 to extend beyond latch bolt head 5. This prevents latch bolt head 5 from interfering with any cargo placed within the bed of pickup truck 1 or with a tailgate accessory that attaches to adapter body 12.

Figure 8:
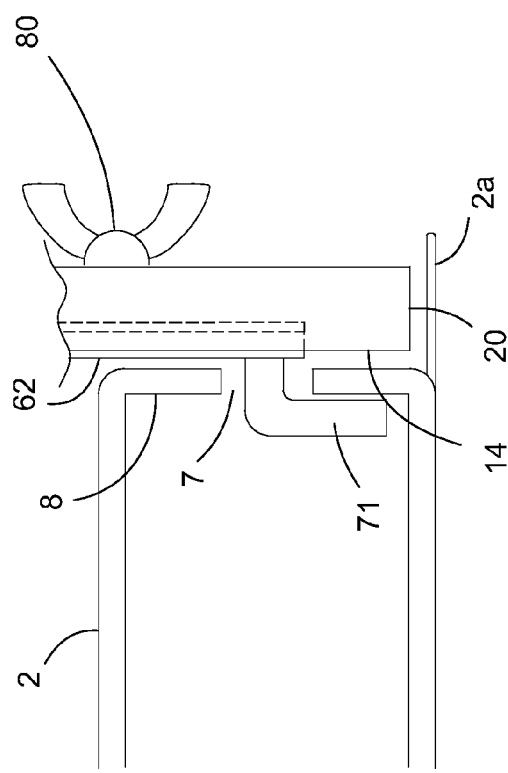
FIG. 8 is a partial, cross-sectional view of the embodiment in FIG. 1 showing the adapter connected to a tailgate aperture using the offset hook anchor.

FIG. 8 is a cross-sectional view of a tailgate 2 with an offset hook anchor 60 coupled to a tailgate opening 7 in the tailgate 2. It should be noted that the size of the opening in the sidewall 8 of the tailgate 2 is exaggerated for clarity. As can be seen in FIG. 8, elongated end portion 71 of offset hook anchor 60 is inserted into drain opening 7 in side wall 8 of tailgate 2. When fastener 80 is tightened, the pull direction of fastener 80 forces first side 14 toward offset hook anchor 60 and side wall 8 while simultaneously causing elongated end portion 71 to engage against the inside of side wall 8. Offset hook anchor 60 advantageously uses tailgate opening 7 to forcibly lock adapter 10 in position on pickup truck 1 and allows attachment of a tailgate accessory to the tailgate and/or bed sidewall without drilling or forming new openings in the tailgate, bed sidewall or bed floor. This is a distinct advantage over prior art devices that require forming new openings for using fasteners of those devices. Forming new openings in a tailgate, bed sidewall or bed floor has the distinct disadvantage of exposing uncoated metal to the elements, which enhances deterioration of the metal through corrosion. Where the present invention uses the tailgate latch bolt 4 and the tailgate sidewall opening 7, there is no exposed metal surface subject to corrosion by the elements since the tailgate sidewall opening 7 is formed in the tailgate 2 prior to priming and painting of the truck body. FIG. 8 also more clearly shows a tailgate lip 2a that is typical of all pickup truck tailgates. As previously explained, bottom edge 20 of adapter 10 may also engage tailgate lip 2a to provide a third support point/surface for adapter 10.

Figure 10:
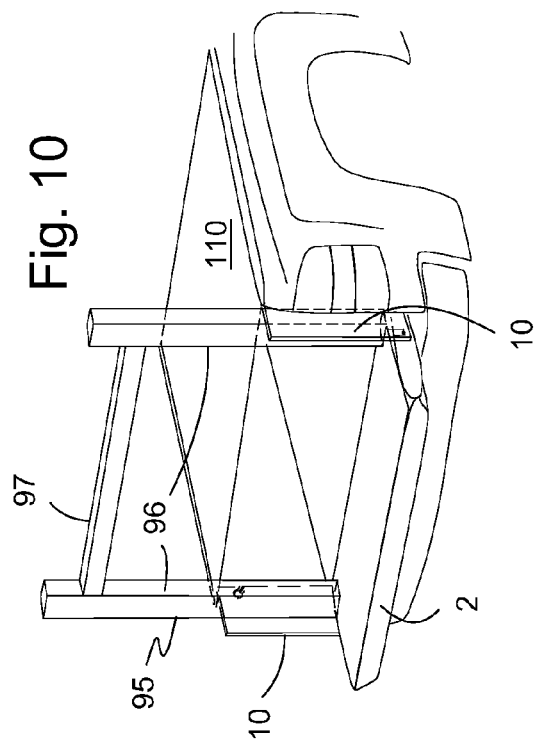
FIG. 10 is a perspective view of another tailgate accessory attached to the adapter in FIG. 1 showing a truck rack supported by a tailgate of a pickup truck bed having a tonneau cover.
Figure 9:
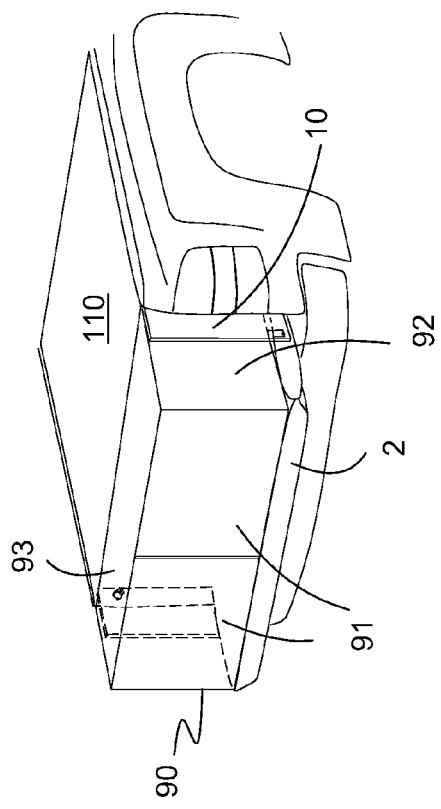
FIG. 9 is a perspective view of one tailgate accessory attached to the adapter in FIG. 1 showing an enclosed tailgate extender connected to a pickup truck bed having a tonneau cover.
Figure 11:
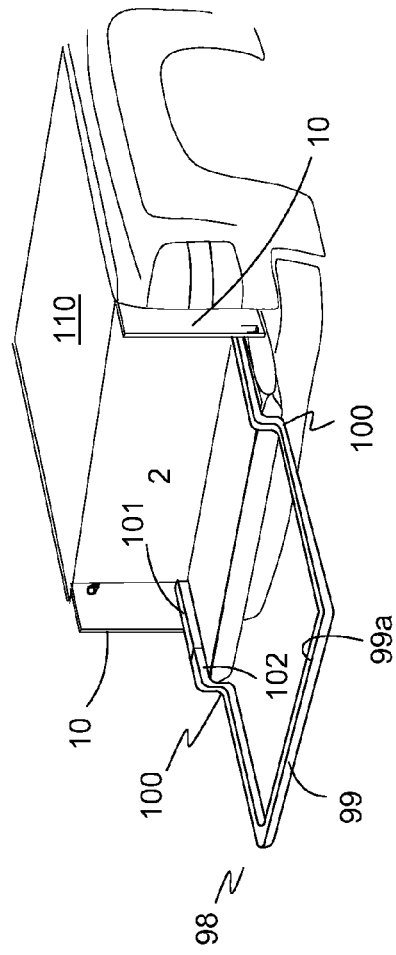
FIG. 11 is a perspective view of another tailgate accessory attached to the adapter in FIG. 1 showing a cargo support bar that extends beyond the open tailgate.

Turning now to FIGS. 9-11, there are illustrated three specific examples of possible tailgate accessories for use with drill-less adapter 10. In all three figures, a tonneau cover 110 is mounted over the pickup truck bed but should not be construed as limiting their use only with tonneau covers. In fact, the adapter 10 and the tailgate accessory may be used with an open truck bed. FIG. 9 shows one embodiment of an enclosed bed extender 90 with a two hinged doors 91, a pair of opposed side walls 92 and a top wall 93. This embodiment provides additional bed length for cargo such as boards, pipes, sheets of building materials, and other cargo of similar size while protecting the cargo from the elements. FIG. 10 shows one embodiment of a truck rack 95 having a pair of upright, vertically-extending posts 96 and a crossbar 97. Truck rack 95 is securely attached to adapter 10 with fasteners such as bolts, pins, nuts, or other quick-release fastener hardware. There may also be included a bracket 55a on first side surface 14 to receive the upright posts 96 of truck rack 95 to reduce the number of truck rack fasteners required for attaching to adapter 10. Crossbar 97 may be permanently mounted to upright posts 96 or adjustably and/or removably mounted to upright posts 96. FIG. 11 shows another embodiment of a bed extender 98. Bed extender 98 is a preformed, tubular structure that provides a cross support 99 that has a top support surface 99a substantially co-planar with the bed floor and the tailgate. As can be seen, cross support 99 is connected to adapter 10 by way of a pair of parallel side supports 100. Side supports 100 are removably attached to first side 14 of adapter 10 and are supported along a portion of their length by tailgate 2. Bed extender 98 may be a single piece of tubular material or may be a plurality of pieces forming a storable kit. Additionally, side supports 100 of bed extender 98 may be any length and may be made adjustable where a first portion of a side support is telescopically received and supported by a second portion of a side support 100.

Some of the many advantages of the present invention include attachment of the drill-less adapter 10 without the need to modify the tailgate, bed sidewall and/or bed floor, use with or without a tonneau cover without modification of the tonneau cover, simple and easy mounting to the tailgate and sidewall of the pickup truck bed, easy and quick assembly of the adapter, etc.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A tailgate accessory drill-less adapter for connecting a tailgate accessory to a tailgate portion of a pick-up truck, the adapter comprising:
   an elongated body having a first side, a bottom edge, a first side edge, and a second side edge, the first side edge having a tailgate latch bolt slot transverse to the first side edge and through the elongated body, the slot positioned a predefined distance from the bottom edge to provide a first attachment point to a tailgate latch bolt; and
   an offset hook anchor having a hook portion and a hook body portion, the offset hook anchor connected to the first side adjacent to but spaced from the second side edge wherein the hook portion is adjustable along an axis transverse to the bottom edge and configured to be retained within a tailgate sidewall opening as a second attachment point.

2. The adapter of claim 1 wherein the tailgate latch bolt slot has a slot recess disposed on a second side of the elongated body wherein the slot recess is wider than the slot and configured to receive a head of the tailgate latch bolt.

3. The adapter of claim 1 wherein the latch bolt slot has a shape that is one of curved, straight, angled, and L-shaped.

4. The adapter of claim 1 wherein the bottom edge has a notch adjacent the first side edge wherein the notch is configured to be disposed over a pivot of a tailgate of a pickup truck.

5. The adapter of claim 4 wherein the notch terminates in an arcuate surface.

6. The adapter of claim 1 wherein the hook portion extends from a first hook body side of hook body portion then defining about a ninety degree bend a predefined distance from the first hook body side and longitudinally extending a predefined distance parallel to and away from the hook body portion.

7. The adapter of claim 6 wherein hook body portion has a component selected from the group consisting of a longitudinal slot therethrough, an aperture for receiving a retaining hardware rod therethrough, a threaded aperture for receiving a threaded retaining hardware rod, and a retaining hardware threaded rod extending from a second hook body side a predefined distance.

8. The adapter of claim 1 wherein the elongated body of the adapter has one component from the group consisting of a longitudinal slot therethrough spaced from the bottom edge and extending parallel to and adjacent the second side edge for adjustably connecting the offset hook anchor, an aperture for receiving a retaining hardware rod therethrough, a threaded aperture for receiving a threaded retaining hardware rod, and a retaining hardware threaded rod extending from the first side of the elongated body.

9. The adapter of claim 1 further comprising an offset hook anchor recess in the first body side extending from the bottom edge a predefined distance parallel to the second side edge and configured to receive the hook body portion.

10. The adapter of claim 1 further comprising one or more attaching structures for securing a tailgate accessory to the adapter wherein the attaching structures are one or more of an opening, a slot, a recess, a channel, a slit, a socket, a cut, a groove, and a bracket and any combination thereof.

11. The adapter of claim 1 further comprising a bracket connected to the second side of the adapter body enabling a fastener-free mating with the tailgate accessory.

12. The adapter of claim 10 wherein the tailgate accessory is a truck bed extender.

13. The adapter of claim 12 wherein the truck bed extender is a covered enclosure.

14. The adapter of claim 10 wherein the tailgate accessory is a truck rack.

15. A method of attaching a tailgate accessory adapter to a tailgate without drilling apertures into the truck bed sidewall, the truck bed floor and/or the tailgate, the method comprising:
   obtaining a set of complimentary, mirror-image tailgate accessory drill-less adapters wherein each of the drill-less adapters has an elongated adapter body having a first side, a bottom edge, a first side edge, and a second side edge, the first side edge having a tailgate latch bolt slot transverse to the first side edge and through the elongated body, the slot positioned a predefined distance from the bottom edge to provide a first attachment point to a tailgate latch bolt and an offset hook anchor having a hook portion and a hook body portion, the offset hook anchor connected to the first side adjacent to but spaced from the second side edge wherein the hook portion is adjustable along an axis transverse to the bottom edge and configured to be retained within a tailgate sidewall opening as a second attachment point;
   inserting the hook portion into a tailgate sidewall opening located on the side wall of the tailgate that is in an open position where the aperture is closer to a bottom of the tailgate than a top of the tailgate and the tailgate latch bolt slot around the tailgate latch bolt; and adjusting the height of each adapter and tightening the offset hook anchor to the adapter body whereby the hook portion and the tailgate latch bolt slot secures the adapter to the tailgate latch bolt and the tailgate.

16. The method of claim 15 further comprising obtaining drill-less adapters having a notch in the bottom edge adjacent the first side edge and placing the notch in the bottom edge onto a tailgate hinge pivot.

17. The method of claim 15 wherein the adjusting step includes contacting one of a tailgate side lip with the bottom edge of the drill-less adapter or contacting a surface of the tailgate hinge pivot with the notch or both.

18. The method of claim 15 further comprising attaching a tailgate accessory to the set of complimentary, mirror-image tailgate adapters.

19. The method of claim 15 further comprising attaching a truck rack to the adapter body of the drill-less adapters.

20. The method of claim 15 further comprising placing a truck bed extender onto the tailgate and securing the truck bed extender to the adapter body of the drill-less adapters.

* * * * *